United States Patent
Rapparini

(10) Patent No.: US 10,780,667 B2
(45) Date of Patent: Sep. 22, 2020

(54) MACHINE AND METHOD FOR FORMING CAPSULES WITH PLEATED CAPSULE BODY

(71) Applicant: Ica S.p.A, Bologna (IT)

(72) Inventor: Gino Rapparini, Bologna (IT)

(73) Assignee: ICA S.P.A., Bologna (IT)

(*) Notice: Subject to any disclaimer, the term of this patent is extended or adjusted under 35 U.S.C. 154(b) by 412 days.

(21) Appl. No.: 15/644,166

(22) Filed: Jul. 7, 2017

(65) Prior Publication Data
US 2018/0215120 A1   Aug. 2, 2018

(30) Foreign Application Priority Data

Feb. 2, 2017 (IT) .......................... 102017000011624

(51) Int. Cl.
*B29C 65/00* (2006.01)
*B29C 65/18* (2006.01)
(Continued)

(52) U.S. Cl.
CPC ............ *B31D 5/0082* (2013.01); *B31B 50/44* (2017.08); *B65B 7/16* (2013.01); *B65B 29/022* (2017.08);
(Continued)

(58) Field of Classification Search
CPC ......... B29C 65/00; B29C 65/02; B29C 65/18; B29C 65/48; B29C 65/4815; B29C 65/56; B29C 65/565; B29C 65/78; B29C 65/7802; B29C 65/7838; B29C 65/7841; B29C 65/7844; B29C 65/7858; B29C 65/7882; B29C 65/7888; B29C 65/7891;
(Continued)

(56) References Cited

U.S. PATENT DOCUMENTS

| 6,440,256 B1* | 8/2002 | Gordon ................... A47J 31/08 156/293 |
| D726,006 S | 4/2015 | Rapparini ...................... D9/434 |

(Continued)

FOREIGN PATENT DOCUMENTS

EP   2093148   9/2011   ........... B65B 61/100

OTHER PUBLICATIONS

Action dated Sep. 20, 2017 in corresponding Italian application 102017000011624, with English translation, 9 pages.

*Primary Examiner* — Philip C Tucker
*Assistant Examiner* — Brian R Slawski
(74) *Attorney, Agent, or Firm* — Fattibene and Fattibene LLC; Paul A. Fattibene

(57) ABSTRACT

The present invention describes a method and a machine for the formation of a capsule (100) for producing beverages in which the capsule (100) comprises a pleated capsule body (101) and a reinforcing element (102). The method comprises the following steps: a step of forming the pleated capsule body (101) of the capsule (100) in a first station (110); a step of supplying the reinforcing element (102) in a second station (111) different from the first station (110); a step of transporting the pleated capsule body (101) from the first station (110) to the second station (111); a step of insertion in the second station of the pleated capsule body (101) in the reinforcing element (102); a step of coupling between the pleated capsule body (101) and the reinforcing element (102) in the second station (111).

11 Claims, 14 Drawing Sheets

(51) Int. Cl.
| | |
|---|---|
| *B29C 65/78* | (2006.01) |
| *B29C 65/80* | (2006.01) |
| *B32B 37/00* | (2006.01) |
| *B65B 29/02* | (2006.01) |
| *B65D 85/804* | (2006.01) |
| *B01D 29/11* | (2006.01) |
| *B01D 29/21* | (2006.01) |
| *B31D 5/00* | (2017.01) |
| *B65B 57/04* | (2006.01) |
| *B31B 50/44* | (2017.01) |
| *B65B 7/16* | (2006.01) |
| *B65B 43/50* | (2006.01) |
| *B65B 61/06* | (2006.01) |
| *B65B 61/20* | (2006.01) |
| *B31B 105/00* | (2017.01) |
| *B31B 120/50* | (2017.01) |
| *B31B 110/20* | (2017.01) |
| *B31B 110/10* | (2017.01) |
| *B31B 120/70* | (2017.01) |
| *B29L 31/14* | (2006.01) |

(52) U.S. Cl.
CPC .............. *B65B 43/50* (2013.01); *B65B 57/04* (2013.01); *B65B 61/06* (2013.01); *B65B 61/20* (2013.01); *B01D 29/111* (2013.01); *B01D 29/21* (2013.01); *B29C 65/18* (2013.01); *B29C 65/7838* (2013.01); *B29C 65/7885* (2013.01); *B29C 65/7891* (2013.01); *B29C 65/80* (2013.01); *B29C 66/24221* (2013.01); *B29C 66/301* (2013.01); *B29C 66/545* (2013.01); *B29C 66/612* (2013.01); *B29C 66/63* (2013.01); *B29C 66/712* (2013.01); *B29C 66/723* (2013.01); *B29C 66/727* (2013.01); *B29C 66/73183* (2013.01); *B29C 66/7486* (2013.01); *B29C 66/8322* (2013.01); *B29L 2031/14* (2013.01); *B31B 2105/00* (2017.08); *B31B 2110/10* (2017.08); *B31B 2110/20* (2017.08); *B31B 2120/50* (2017.08); *B31B 2120/70* (2017.08); *B65D 85/8043* (2013.01)

(58) Field of Classification Search
CPC ..... B29C 65/7897; B29C 65/80; B29C 66/00; B29C 66/242; B29C 66/24221; B29C 66/301; B29C 66/51; B29C 66/53; B29C 66/532; B29C 66/5324; B29C 66/5326; B29C 66/63; B29C 66/72; B29C 66/723; B29C 66/712; B29C 66/727; B29C 66/73181; B29C 66/73183; B29C 66/7486; B29C 66/8322; B29C 66/81415; B29C 66/61; B29C 66/612; B29C 66/54; B29C 66/542; B29C 66/545; B29C 66/83221; B65B 29/02; B65B 29/0222; B65B 29/025; B65B 61/20; B65D 85/8043; B01D 29/111; B01D 29/21; B01D 29/13; B29L 2031/14
USPC ..... 156/60, 64, 69, 183, 196, 210, 212, 213, 156/215, 221, 222, 224, 228, 242, 245, 156/250, 252, 253, 256, 264, 269, 270, 156/292, 293, 294, 308.2, 308.4, 309.6, 156/349, 350, 362, 363, 367, 378, 423, 156/443, 510, 516, 517, 521, 538, 539, 156/556, 566, 567, 580, 582, 583.1; 493/405; 206/0.5; 264/239, 299, 319, 264/320, 324, 241, 257, 258, 259, 323, 264/267, 268

See application file for complete search history.

(56) References Cited

U.S. PATENT DOCUMENTS

| | | | |
|---|---|---|---|
| D730,734 S | 6/2015 | Rapparini | D9/454 |
| 2008/0314256 A1* | 12/2008 | Smith | B65D 85/816 99/298 |
| 2011/0016834 A1* | 1/2011 | Rapparini | B65B 9/042 53/510 |
| 2011/0247975 A1 | 10/2011 | Rapparini | 210/321.6 |
| 2012/0269933 A1 | 10/2012 | Rapparini | 426/82 |
| 2015/0246741 A1 | 9/2015 | Hansen et al. | B65B 29/02 |
| 2016/0288936 A1 | 10/2016 | Manaresi et al. | B65B 29/02 |
| 2017/0096243 A1* | 4/2017 | Manaresi | B65B 29/022 |
| 2017/0210534 A1 | 7/2017 | Rapparini | B65B 77/22 |

* cited by examiner

MACHINE AND METHOD FOR FORMING CAPSULES WITH PLEATED CAPSULE BODY

TECHNICAL FIELD

The present invention refers to the technological field of capsules for obtaining infusions. In particular, the present invention refers to the field of capsules with pleated capsule body.

BACKGROUND

Some types of capsule for producing beverages comprising a pleated capsule body that forms the containment volume of the product from which the beverage derives and that is made of filter material, for example paper material, are known. Such filters have the great advantage of being environmentally-friendly. However, since they are for example made of paper material, they have the drawback of needing an additional structural member capable of ensuring the stability thereof.

Therefore, for example, reinforcing rings or cups are used, to which such filters are welded. In this way, such additional elements ensure that the capsule has structural stability.

A capsule 100 of this type is shown in FIG. 1. The capsule 100 comprises a pleated capsule body 101. The capsule body 101 defines the containment volume of the product from which the beverage is obtained, for example coffee powder, tea leaves or similar. The capsule body 101 has a substantially flat bottom wall and a pleated side wall, i.e. made with regular or irregular folds. The capsule body 101 of the capsule 100 shown in FIG. 1 has the shape of a ramekin.

The advantage of the pleating of the capsule body consists of the increase in filtering surface of the capsule body with respect to capsules with a smooth capsule body of the same dimensions. Moreover, capsules with pleated capsule body can be particularly appreciated by customers due to their appearance. Examples of capsules with pleated capsule body are shown in EC design patent EM03311612.

Since the capsule body is made of compostable or in any case flexible material, and since it has to withstand mechanical operations like for example perforation (to allow a liquid such as water to enter inside the capsule body) it becomes necessary to add a reinforcing element that ensures greater rigidity of the capsule body.

For this purpose, as shown in the figures, reinforcing elements 102 like reinforcing rings are used, inside which the pleated capsule bodies 101 are inserted and fixed.

Examples of reinforcing rings for capsules for producing beverages can be found in the American patent application published with number US 2011/0247975 A1, in the PCT application published with number WO 2015/186035 A1 and in the American design patents published with number U.S. D730,734 S and U.S. D726,006 S.

Alternatively, as shown in FIG. 2, the reinforcing element 102 can be represented by a container that encloses the pleated capsule body 101, for example a cup or similar. In the case in which the reinforcing element 102 consists of a cup, such a cup will form an external container with respect to the capsule body 101. Therefore, in this case, the capsule 100 will be characterised in that it has a capsule body 101 contained inside a container that has the function of being a reinforcing element. The container can advantageously be made of barrier material, for example oxygen barrier material. The advantage of the reinforcing element in the form of a container with respect to the reinforcing ring is that of improving the conservation of the organoleptic properties of the product contained in the capsule body 101, in particular in the case in which the container is made of barrier material.

An example of a capsule with a capsule body arranged inside a container made of barrier material can be found in FIGS. 14 and 15 of European patent EP 2 490 962 B1.

In both cases the capsule body 101 will be fixed, for example welded or thermowelded, to the reinforcing element 102 so as to constitute a capsule 100 having a greater rigidity and stability with respect to that of the capsule body 101.

In both cases, after having filled the capsule body 101 with the product from which the beverage is obtained, it is possible to close the system with a cover, for example a cover made of barrier material. The reinforcing element 102 can therefore also be used to support the cover of the capsule. The cover can be fixed, for example welded, to the reinforcing element.

Making capsules with the pleated capsule body normally foresees many successive steps on a single transport and in any case transporting the pleated capsule body directly inside the reinforcing element.

For example, European patent EP 2 093 148 B1 describes a plant for producing single-dose capsules having an impermeable shell 101. In such a system, in a first station 3 the formation of the pleated capsule body 105 and the partial insertion of the latter directly in the impermeable shell 101 take place. In a second station 5 the pleated capsule body 105 is totally inserted, positioned and partially welded to the outer shell 101. In a third station 6 the pleated capsule body 105 is totally welded to the impermeable shell 101 so as to form a single element. However, this type of embodiment has the major drawback of having to transport a filter partially inserted in an impermeable shell that due to the elasticity and the conicity thereof will tend to slip out, harming the precision and forcing the subsequent operations to obtain the desired result to be increased. Moreover, once the filter is even only partially inserted in the impermeable shell, due to the narrow diameter of the latter there will be a conicity of the filter that is so low that all of the groups that will carry out the subsequent operations will have to carry out additional, often complicated movements that can easily cause breaks, in order to be able to insert in the filter and subsequently widen to avoid moving the filter and carrying out the correct welding. For example, the fact that it has a variable geometry welder is particularly complex since, to make a circular weld, it involves the division of the welding process of the circular surface into at least two steps separated by an interval during which the welder carries out a rotation around its axis.

Another drawback of such an embodiment consists of the fact that possible tears of the filter created in the forming step in the first station 3 are difficult to detect since they can only be seen from the upper open side of the impermeable shell and, even if detected, result in the filter joined to the impermeable shell being discarded with obvious waste of material.

The problem to be solved is therefore that of optimising the manufacture of the capsule using as few operations as possible, carried out by simple groups, and increasing the flexibility of the system and the certainty of the manufacturing quality of the finished product, being able to detect the possible defects of the filter before it is inserted in the rigid impermeable shell and thus being able to discard it as a single unit, avoiding additional wasting of packaging material.

SUMMARY

The present invention is based on the idea of carrying out the step of inserting, welding and coupling the reinforcing element with the pleated capsule body in a single station.

According to an embodiment of the present invention a method for the formation of a capsule for producing beverages is provided that comprises a pleated capsule body and a reinforcing element, in which the method comprises the following steps:
  a. formation of the pleated capsule body of the capsule in a first station;
  b. supply of the reinforcing element in a second station different from the first station;
  c. transportation of the pleated capsule body from the first station to the second station;
  d. insertion in the second station of the pleated capsule body in the reinforcing element;
  e. fixing of the pleated capsule body to the reinforcing element in the second station.

This solution is particularly advantageous since it makes it possible to effectively reduce the operations to be carried out and to increase the quality of manufacture of capsules with pleated capsule body. This is because an intermediate transport is exploited that allows the insertion of the pleated capsule body in the reinforcing element and the welding to the outer shell in a single station with simple groups that are easy to make. Such a solution is particularly advantageous with respect to the state of the art since in the latter the step of insertion already took place in the formation station directly in the impermeable shell. Conversely, according to the embodiment of the present invention described above the insertion step takes place in the second station (welding station). This provision makes it possible to separate the two processes (coupling and formation) by creating a differentiation of the diameters that facilitates the insertion and the welding thereof in a single station and allowing an intermediate control step of only the pleated capsule body that allows the possible discarding thereof before being inserted in the outer shell, avoiding additional wasting of packaging material. The fixing step can comprise a welding step that allows the pleated capsule body to be welded to the reinforcing element.

According to an embodiment of the present invention a method for the formation of a capsule for producing beverages is provided that comprises a pleated capsule body and a reinforcing element, in which the fixing step comprises a welding step carried out by means of a welder; in which the welder has fixed geometry. This configuration is particularly advantageous since it allows the welding operation to be made simpler and safer. This is because the fixed geometry welder is particularly simple. On the other hand, the variable geometry welder is by its very nature much more complex since for example, to make a circular weld, it involves the division of the welding process of the circular surface into at least two separate steps by an interval during which the welder carries out a rotation about its axis.

According to an embodiment of the present invention a method for the formation of a capsule for producing beverages is provided that comprises a pleated capsule body and a reinforcing element, in which the reinforcing element and the pleated capsule body are provided separately and coaxially to the second station to carry out the step of insertion of the pleated capsule body. This solution is particularly advantageous since it makes it possible to couple the pleated capsule body and the reinforcing element inside the second station, thus separating the step of formation of the capsule body and the step of insertion of the capsule body in the reinforcing element. Moreover, the fact that the two elements are supplied in coaxial position effectively allows the difficulties in the insertion of one element inside the other to be reduced.

According to an embodiment of the present invention a method for the formation of a capsule for producing beverages is provided that comprises a pleated capsule body and a reinforcing element, in which the insertion step and/or the fixing step are carried out by exploiting a difference of diameters between the elements that constitute the second station. This solution is particularly advantageous since thanks to this difference of diameters it is possible to effectively couple the pleated capsule body and the reinforcing element.

According to an embodiment of the present invention a method for the formation of a capsule for producing beverages is provided that comprises a pleated capsule body and a reinforcing element, in which the difference of diameters makes it possible to have a pleated capsule body that during the transportation step has an upper diameter much greater than the diameter of a fixed geometry welder with which the pleated capsule body is welded together with the reinforcing element, in which a ratio between the upper diameter of the pleated capsule body and the diameter of the welder, during a step of insertion of the welder in the pleated capsule body, is greater than 1, more preferably greater than 1.1, even more preferably greater than 1.2. This solution is particularly advantageous since it makes it possible to have extreme ease of insertion of the welder inside the pleated capsule body. Such an advantage is ensured by the fact that the pleated capsule body is housed inside a housing having a greater diameter than the welder and it is thus possible to insert the welder with extreme ease not having risks of collision with the pleated capsule body.

According to an embodiment of the present invention a method for the formation of a capsule for producing beverages is provided that comprises a pleated capsule body and a reinforcing element, in which the step of formation of the pleated capsule body comprises the following steps:
  a. unrolling of at least one film from reel;
  b. conveying of the film in the first station;
  c. blanking of a portion of the film;
  d. formation of the pleated capsule body from the blanked portion.

This solution makes it possible to form the pleated capsule body from a film coming from reel. This solution is particularly advantageous since it makes it possible to have very short manufacturing times of the pleated capsule body thanks to the film coming from reel that allows films to be supplied continuously.

According to an embodiment of the present invention a method for the formation of a capsule for producing beverages is provided that comprises a pleated capsule body and a reinforcing element, in which the step of formation of the pleated capsule body comprises a step of formation from at least two films arranged one above the other so as to form the pleated capsule body having a layered structure. This solution is particularly advantageous since it makes it possible to have a plurality of pleated capsule bodies one inside the other. The films coming from a plurality of reels are arranged one on top of the other without however needing to be welded to one another since during the formation process of the pleated capsule body each film will have the same shape and therefore will remain interlocked with each other. This solution is also particularly advantageous since capsule bodies can be made having many layers each of which has a particular property like for example being impermeable to external agents, for example to oxygen, or having a different fineness of filter.

According to an embodiment of the present invention a method for the formation of a capsule for producing beverages is provided that comprises a pleated capsule body and a reinforcing element, in which the reinforcing element is a reinforcing ring. Examples of reinforcing rings for capsules for producing beverages that can be used based on the present invention can be found in the American patent application published with number US 2011/0247975 A1, in PCT application published with number WO 2015/186035 A1 and in American design patents published with number U.S. D730,734 S and U.S. D726,006 S.

According to an embodiment of the present invention a method for the formation of a capsule for producing beverages is provided that comprises a pleated capsule body and a reinforcing element, in which the reinforcing element is a container or a cup adapted for housing the capsule body, for example a container made of barrier material, for example an oxygen barrier.

According to an embodiment of the present invention a method for the formation of a capsule for producing beverages is provided that comprises a pleated capsule body and a reinforcing element, in which the step of coupling between the reinforcing element and the pleated capsule body is carried out on a rotatable drum. This solution is particularly advantageous since it makes it possible to combine many processes that are carried out on the surface of said drum. For example, the welding step, the filling step, the closing step, the step of supplying the reinforcing element are all processes that can be carried out on the rotatable drum so as to have a particularly compact and efficient system for making the capsule.

According to an embodiment of the present invention a method for the formation of a capsule for producing beverages is provided that comprises a pleated capsule body and a reinforcing element, in which the step of coupling between the reinforcing element and the pleated capsule body is carried out on a carousel.

According to an embodiment of the present invention a method for the formation of a capsule for producing beverages is provided that comprises a pleated capsule body and a reinforcing element, in which the step of coupling between the reinforcing element and the pleated capsule body is carried out on a linear system.

According to an embodiment of the present invention a method for the formation of a capsule for producing beverages is provided that comprises a pleated capsule body and a reinforcing element, further comprising a step of checking the pleated capsule body during the transportation step. This solution is particularly advantageous since it makes it possible to check, by means of optical checking, that the capsule body does not have imperfections and is suitable for being filled. In the case in which, for example, imperfections are detected, it is thus possible to discard such a capsule body before it is coupled with the reinforcing element. In this way it is thus possible to prevent the production of a capsule that has imperfections of the pleated capsule body.

According to an embodiment of the present invention a method for the formation of a capsule for producing beverages is provided that comprises a pleated capsule body and a reinforcing element, in which the pleated capsule body is made of filter material, more preferably compostable filter material. This solution is particularly advantageous since it makes it possible to have a pleated capsule body also having the function of a filter. Since the filtering surface represented by the capsule body is extremely large, such a solution is particularly advantageous since it makes it possible to effectively improve the filtering of the solution contained inside the capsule body. The fact that the material is compostable makes it possible to avoid the problems relative to the disposal of waste.

According to a further embodiment of the present invention a machine for forming a capsule having a pleated capsule body and a reinforcing element is provided, the machine comprises a first station configured so as to form the pleated capsule body; the machine further comprises transport means configured so as to conduct the pleated capsule body from the first station to a second station; the second station is configured so as to be able to insert the pleated capsule body in the reinforcing element and weld together the two elements. This solution is particularly advantageous since it makes it possible to optimise the manufacture of the capsule using as few operations as possible, carried out by simple groups and increasing the productivity of the machine and the quality of the finished product.

According to a further embodiment of the present invention a machine for forming a capsule having a pleated capsule body and a reinforcing element is provided, in which the second station is configured so as to receive the reinforcing element and the pleated capsule body separately and coaxially. This solution is particularly advantageous since it makes it possible to couple the pleated capsule body and the reinforcing element inside the second station, thus separating the formation process of the capsule body and the insertion process of the capsule body in the reinforcing element. Moreover, the fact that the two elements are provided in coaxial position makes it possible to effectively reduce the difficulties in the insertion of one element inside the other.

According to a further embodiment of the present invention a machine for forming a capsule having a pleated capsule body and a reinforcing element is provided, in which in the first station there are cutting means configured so as to cut a portion of film coming from reel; the first station further comprises a mold configured so as to form the pleated capsule body from the portion of film coming from reel. This solution is particularly advantageous since it makes it possible to have very sort manufacturing times of the pleated capsule body thanks to the film coming from reel that allows films to be supplied continuously.

According to a further embodiment of the present invention a machine for forming a capsule having a pleated capsule body and a reinforcing element is provided, in which the transport means comprise a plurality of housings, each of which is configured so as to contain at least one of the pleated capsule bodies. This solution makes it possible to effectively house pleated capsule bodies that, not having yet been combined with the reinforcing element, do not yet have a high structural stability.

According to a further embodiment of the present invention a machine for forming a capsule having a pleated capsule body and a reinforcing element is provided, in which the second station comprises a welder having fixed geometry configured so as to weld the pleated capsule body together with the reinforcing element. This solution makes it possible to fix the reinforcing element with the capsule body so as to obtain a structure having high stability. Moreover, the welding makes it possible to effectively fix the capsule body with the reinforcing element. Moreover, the fact that the welder has a fixed geometry is particularly advantageous since it makes it possible to make the welding operation simpler and safer. This is because otherwise the variable geometry welder is by its very nature more complex since for example, in order to make a circular weld, it involves the division of the welding process of the circular surface into at least two separate steps by an interval during which the welder carries out a rotation around its own axis.

According to a further embodiment of the present invention a machine for forming a capsule having a pleated capsule body and a reinforcing element is provided, in which the second station is arranged on a rotatable drum configured so as to accommodate a plurality of pleated capsule bodies and of reinforcing elements. This solution is particularly advantageous since it makes it possible to combine many processes that are carried out on the surface of said drum. For example, the welding step, the filling step, the closing step, the step of supplying the reinforcing element are all processes that can be carried out on the rotatable drum so as to have a particularly compact and efficient system for making the capsule.

According to a further embodiment of the present invention a machine for forming a capsule having a pleated capsule body and a reinforcing element is provided, in which the second station is arranged on a carousel configured so as to accommodate a plurality of pleated capsule bodies and of reinforcing elements.

According to a further embodiment of the present invention a machine for forming a capsule having a pleated capsule body and a reinforcing element is provided, in which the second station is arranged on a linear system configured so as to accommodate a plurality of pleated capsule bodies and of reinforcing elements.

According to a further embodiment of the present invention a machine for forming a capsule having a pleated capsule body and a reinforcing element is provided, in which the first station is configured so as to accommodate a plurality of films coming from reel. This solution is particularly advantageous since it makes it possible to have a plurality of pleated capsule bodies one inside the other. The films coming from a plurality of reels are arranged one above the other without however needing to be welded with one another since during the formation process of the pleated capsule body each film will take the same shape forma and therefore will remain interlocked with one another. This solution is also particularly advantageous since capsule bodies can be made having many layers each of which has a particular property, like for example being impermeable to external agents.

According to a further embodiment of the present invention a machine for forming a capsule having a pleated capsule body and a reinforcing element is provided, further comprising one or more detecting means positioned at the transport means and configured so as to detect the presence of imperfections on the outer surface of the pleated capsule body. This solution is particularly advantageous since it makes it possible to check that the capsule body does not have imperfections and is suitable for being filled. In the case in which, for example, imperfections are detected, it is possible to discard such a capsule body before it is coupled with the reinforcing element. In this way, it is thus possible to prevent the production of a capsule that has imperfections of the pleated capsule body.

According to a further embodiment of the present invention a machine for forming a capsule having a pleated capsule body and a reinforcing element is provided, in which the inner diameter of the cylindrical part of the opening of the counter-mold is smaller than the diameter of the inner opening of the housing. This solution is particularly advantageous since it makes it possible to effectively insert the pleated capsule body that has just formed inside the housing of the transport means.

According to a further embodiment of the present invention, a method for the formation of a capsule for producing beverages is provided in which the housing has a cavity having a greater diameter than the main inner diameter of the cavity. This solution is particularly advantageous since it makes it possible to have a cavity that is capable of preventing a displacement in the vertical direction of the pleated capsule body.

According to a further embodiment of the present invention a machine for forming a capsule having a pleated capsule body and a reinforcing element is provided, in which the housing has a main inner diameter that is greater than or equal to the diameter of the welder. This solution is particularly advantageous since it effectively allows the welder to enter without difficulties inside the opening of the housing.

According to a further embodiment of the present invention, a machine for forming a capsule for producing beverages is provided in which the reinforcing element has an upper end having a greater outer diameter than the main inner diameter of the housing. This solution is particularly advantageous since it makes it possible, after having carried out the welding, to not drive the capsule inside the housing thanks to a kind of step that is formed due to the difference of diameters described above.

According to a further embodiment of the present invention, a method for the formation of a capsule for producing beverages is provided in which the reinforcing element has an upper end having a smaller inner diameter than the main inner diameter of the housing. This solution is particularly advantageous since it makes it possible to effectively insert the pleated capsule body inside the reinforcing element. Indeed, given that the pleated capsule body was in contact with the inner wall of the housing it is thus certain that, once the capsule body has been introduced it is in contact with the reinforcing element.

According to a further embodiment of the present invention, a system for forming a capsule having a pleated capsule body and a reinforcing element is provided, said system comprises: a first machine comprising a first station configured so as to form the pleated capsule body and transport means configured so as to conduct the pleated capsule body from the first station to a second station; a second machine comprising second transport means configured so as to conduct the reinforcing element in the second station; the system being characterised in that: the first machine and the second machine meet at the second station; the second station is configured so as to be able to insert the pleated capsule body in the reinforcing element. This solution is particularly advantageous since it makes it possible to combine two machines in order to make the capsule. Therefore, it is thus possible to use, as second machines, also machines already present on the market. For example, it is also possible to use different types of second machines according to requirements. An example could indeed be to have a second machine represented by a rotatable drum that also allows various other processes to be carried out on its outer surface like for example the formation of the reinforcing element or even the filling itself of the capsule. Alternatively, a linear system could be used. As an alternative to the systems described above, a carousel could also be used.

According to a further embodiment of the present invention, a system for forming a capsule having a pleated capsule body and a reinforcing element is provided in which the second machine further comprises at least one welder having fixed geometry configured so as to weld the pleated capsule body together with the reinforcing element.

According to a further embodiment of the present invention, a system for forming a capsule having a pleated capsule body and a reinforcing element is provided in which the second station is configured so as to receive the reinforcing element and the pleated capsule body separately and coaxially.

BRIEF DESCRIPTION OF THE FIGURES

The present invention will be described with reference to the attached figures in which the same reference numerals and/or marks indicate the same parts and/or similar parts and/or corresponding parts of the system. In the figures.

DETAILED DESCRIPTION

Hereinafter, the present invention is described with reference to particular embodiments as illustrated in the attached tables of drawings. However, the present invention is not limited to the particular embodiments described in the following detailed description and represented in the figures, but rather the described embodiments simply exemplify the various aspects of the present invention, the purpose of which is defined by the claims. Further modifications and variations of the present invention will become clear to those skilled in the art.

Figure 1:
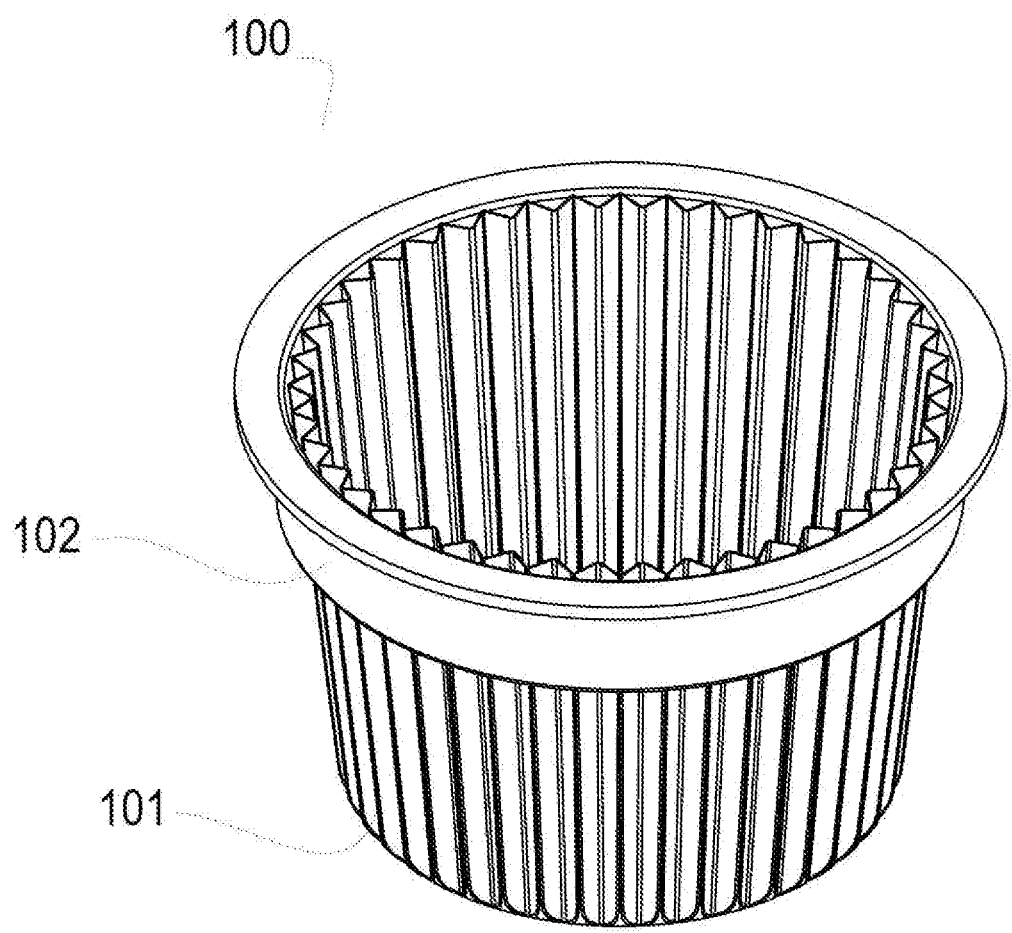
FIG. 1 schematically illustrates an external three-dimensional view of a capsule having pleated capsule body and a reinforcing ring.
Figure 2:
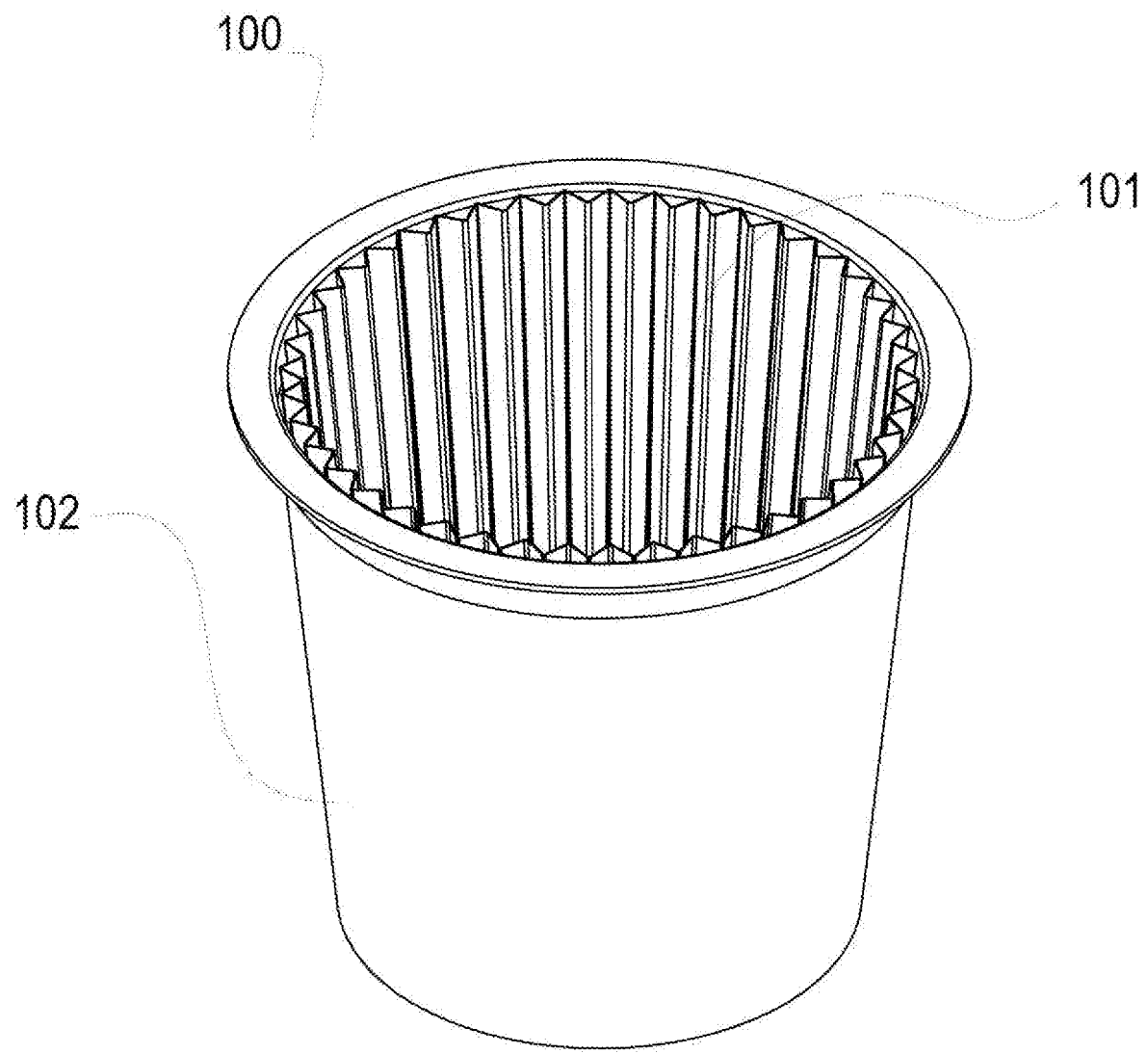
FIG. 2 schematically illustrates an external three-dimensional view of a capsule having pleated capsule body and a reinforcing container.
Figure 3:
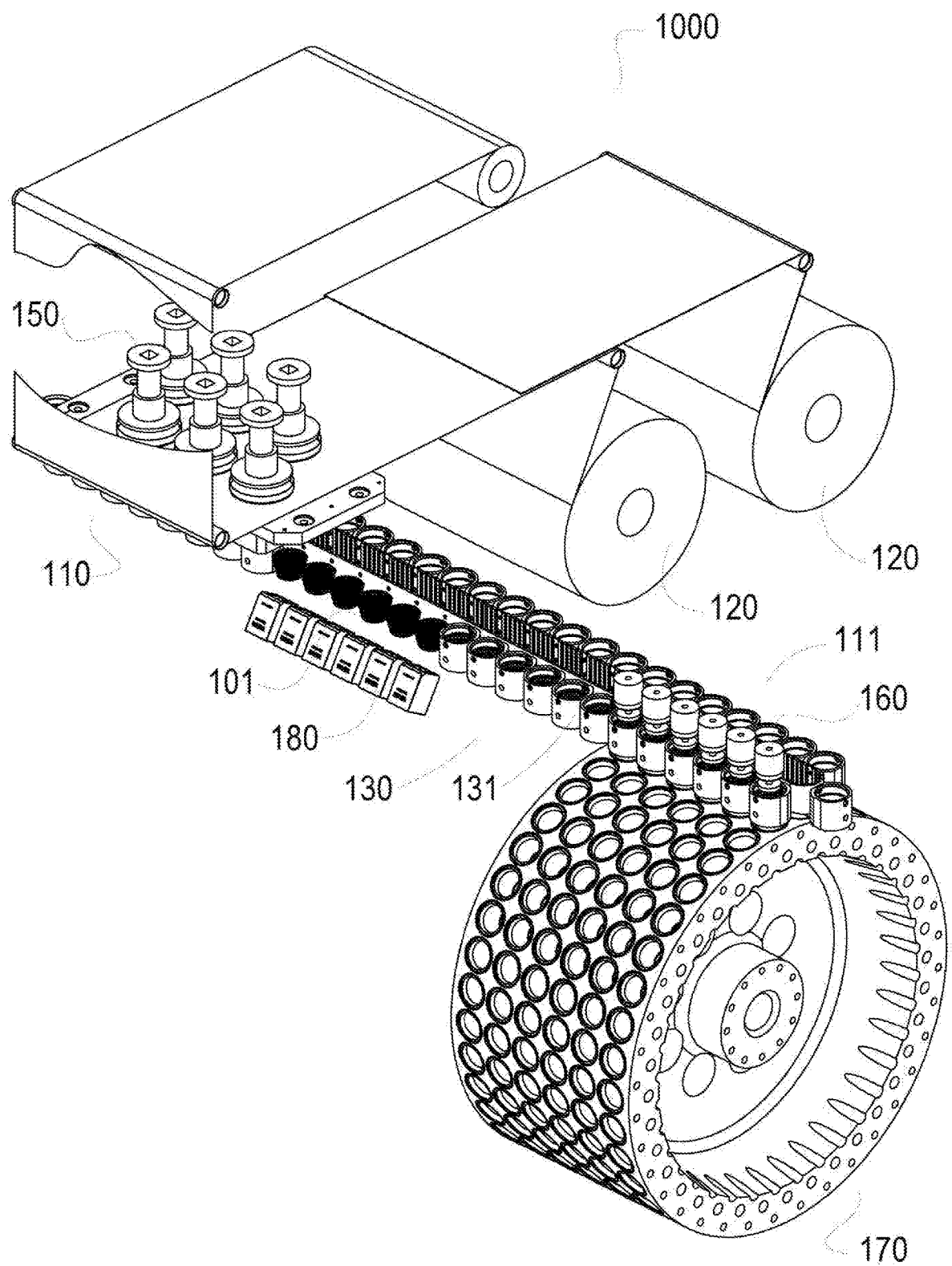
FIG. 3 schematically illustrates a three-dimensional view of a machine for the formation of a capsule according to a particular embodiment of the present invention.

FIG. 3 shows a machine 1000 for the formation of capsules 100 like those described in FIGS. 1 and 2. Such a machine 1000 comprises two stations. The first station 110, hereinafter called forming station, comprises at least one mold 150 for forming the pleated capsule body 101 described above. The second station 111, hereinafter called welding station, comprises at least one welder 160 for welding the pleated capsule body 101 together with the reinforcing element 102. Between the forming station 110 and the welding station 111 there are transport means 130 that comprise a plurality of housings 131 which are capable of accommodating the pleated capsule bodies 101 formed inside the forming station 110. Between the forming station 110 and the welding station 111 there are one or more detecting means 180, like for example video cameras, so as to detect the presence of imperfections of the pleated capsule body 101. For example, with the detecting means 180 it is possible to detect the presence of imperfections both on the inner surface and on the outer surface of the pleated capsule body 101.

As shown in the figures, the forming station 110 is provided with at least one film coming from reel 120 for example through a roller system.

The welding station 111 can be integrated on a system with a rotatable drum 170 that makes it possible for example to house the pleated capsule bodies 101 and the reinforcing element 102.

Hereinafter, with reference to FIGS. 4 to 14, the operative steps of the machine 1000 shown in FIG. 3 are described and then a method for the formation of a capsule 100 for producing beverages based on a particular embodiment of the present invention is described.

Figure 4:
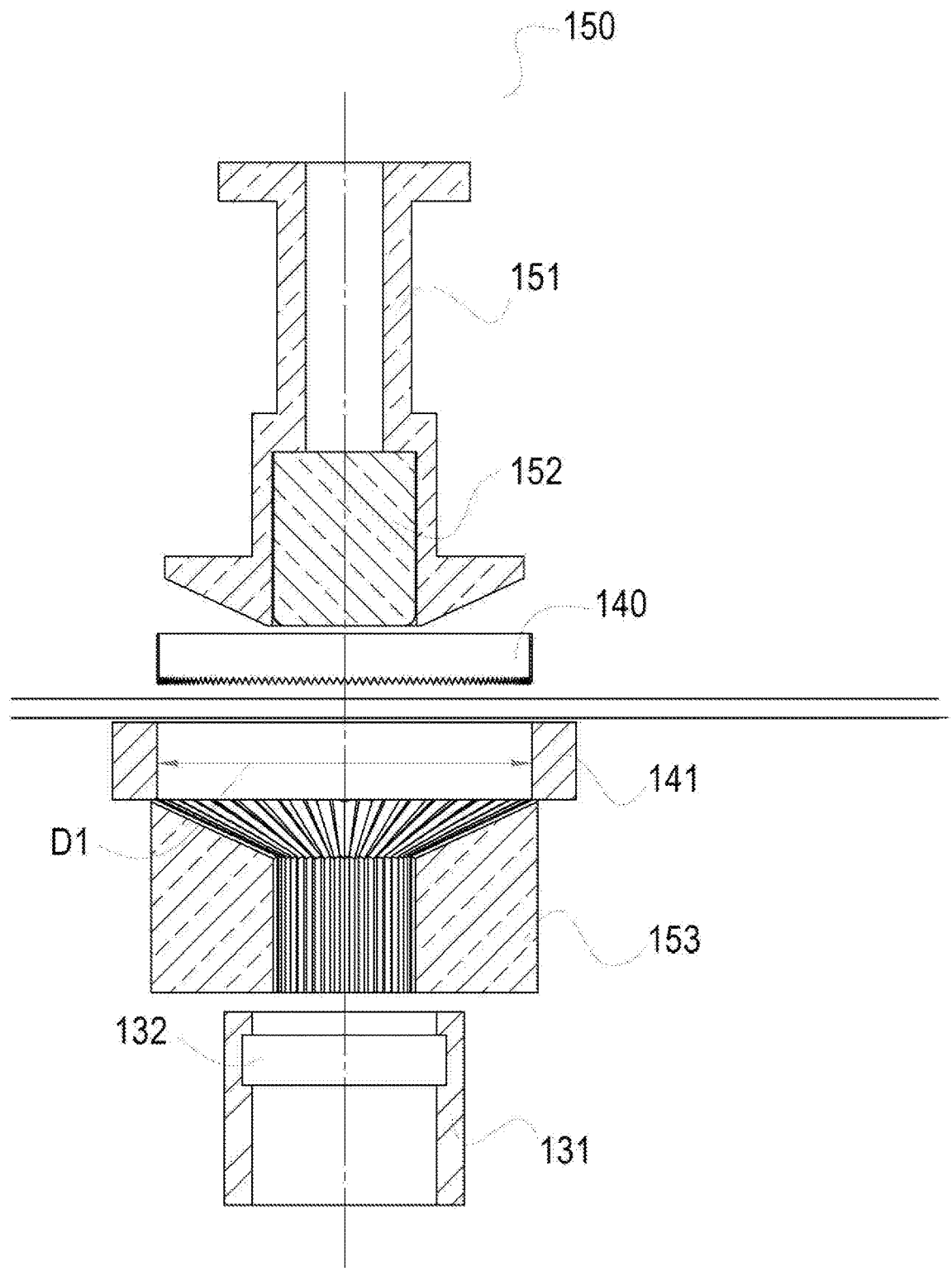
FIG. 4 schematically illustrates a section view of the forming station in a state of the plant stopped according to a particular embodiment of the present invention.

As shown in FIG. 4, the mold 150 comprises two parts: a main body 151 and a forming body 152. As shown in the figures, before the start of the formation step, the two bodies are above the cutting means 140 that are represented for example by a cutter. Underneath there is the matrix 141 of the cutter 140 and even further below a counter-mold 153 having an inner opening. The inner diameter D1 of the matrix 141 can for example be equal to 97 mm.

Figure 5:
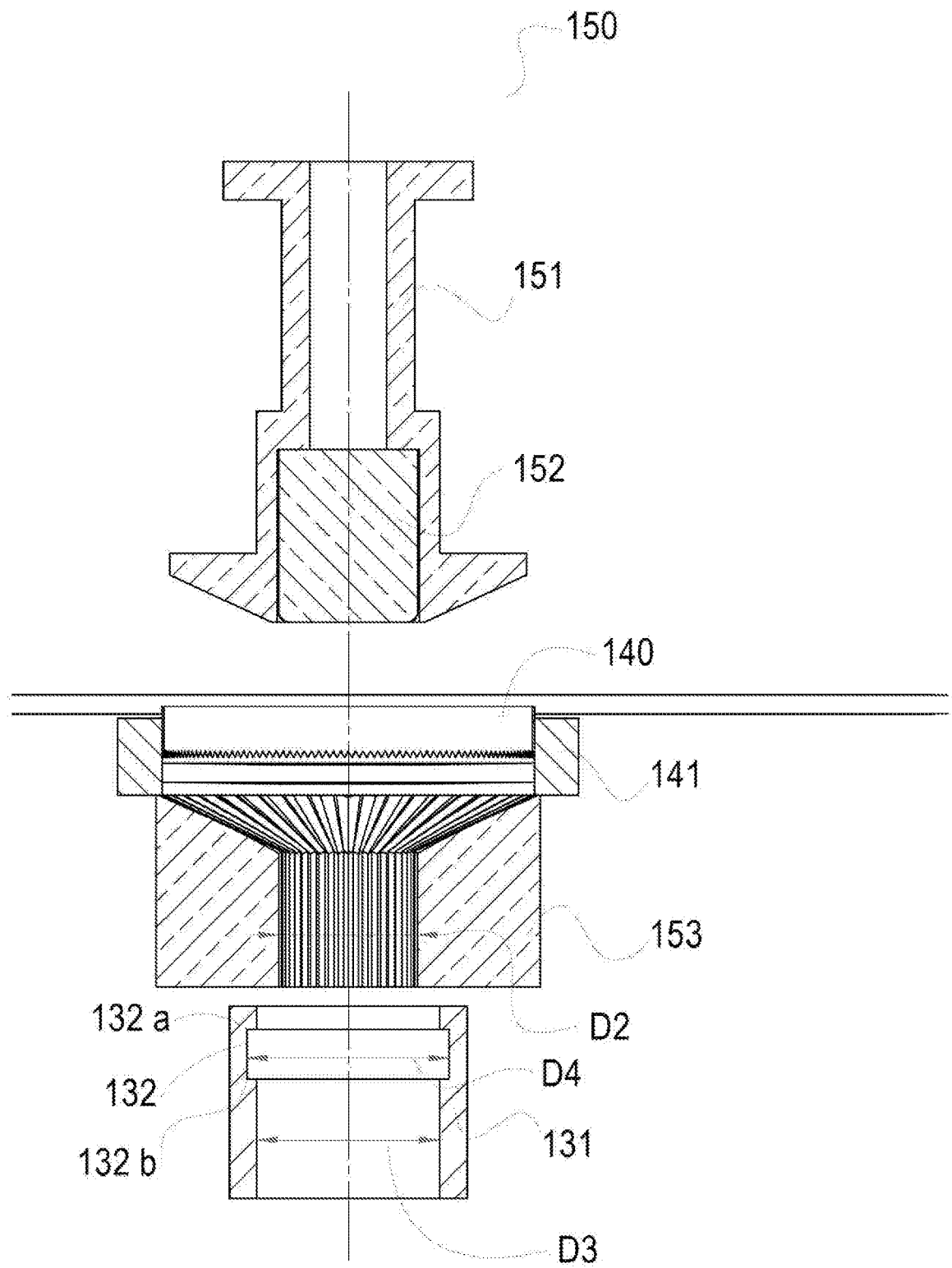
FIG. 5 schematically illustrates a section view of the forming station during the blanking step according to a particular embodiment of the present invention.

As shown in FIG. 5, in a first step, the cutter 140 is moved downwards so as to cut a portion of the film coming from the reel 120. Since the cutting means 140, and therefore the portion of film cut, have an outer diameter less than or equal to the inner diameter of the matrix 141, it is thus possible to conduct such a portion of film through the movement of the cutting means 140 downwards inside the matrix 141. A round-shaped disc is thus formed (in the case in which the cutting means 140 have a circular shape) having a thickness equal to the thickness of the film coming from reel 120 or, in the case in which there are many films overlapping one another, of a thickness equal to the sum of the thickness of each film. As shown in the figures, the counter-mold 153 has an inner opening having a frusto-conical shape for a first section and cylindrical in a second section. The inner edges of such an opening have a pleated shape with any number of pleats or a knurled shape.

In a subsequent step the mold 150 is translated downwards so as to conduct the portion of film cut inside the counter-mold 153. The lower part of the main body 151 has a frusto-conical shape so as to be able to combine with the frusto-conical shape of the opening of the counter-mold 153. Therefore, the main body 151 is translated downwards until it combines with the counter-mold 153. The portion of film cut, which will therefore be between the main body 151 and the counter-mold 153, will thus have taken up a frusto-conical shape with a pleated side surface. At this point, the forming body 152, which has a cylindrical shape so as to combine with the cylindrical part of the opening of the counter-mold 153, will be translated downwards so as to drive the portion of film inside the cylindrical part of the opening of the counter-mold 153. At this point, after the pleated capsule body 101 is conducted outside of the counter-mold 153, the pleated capsule body 101 will have formed, having a cylindrical shape, from the portion of film cut.

Figure 6:
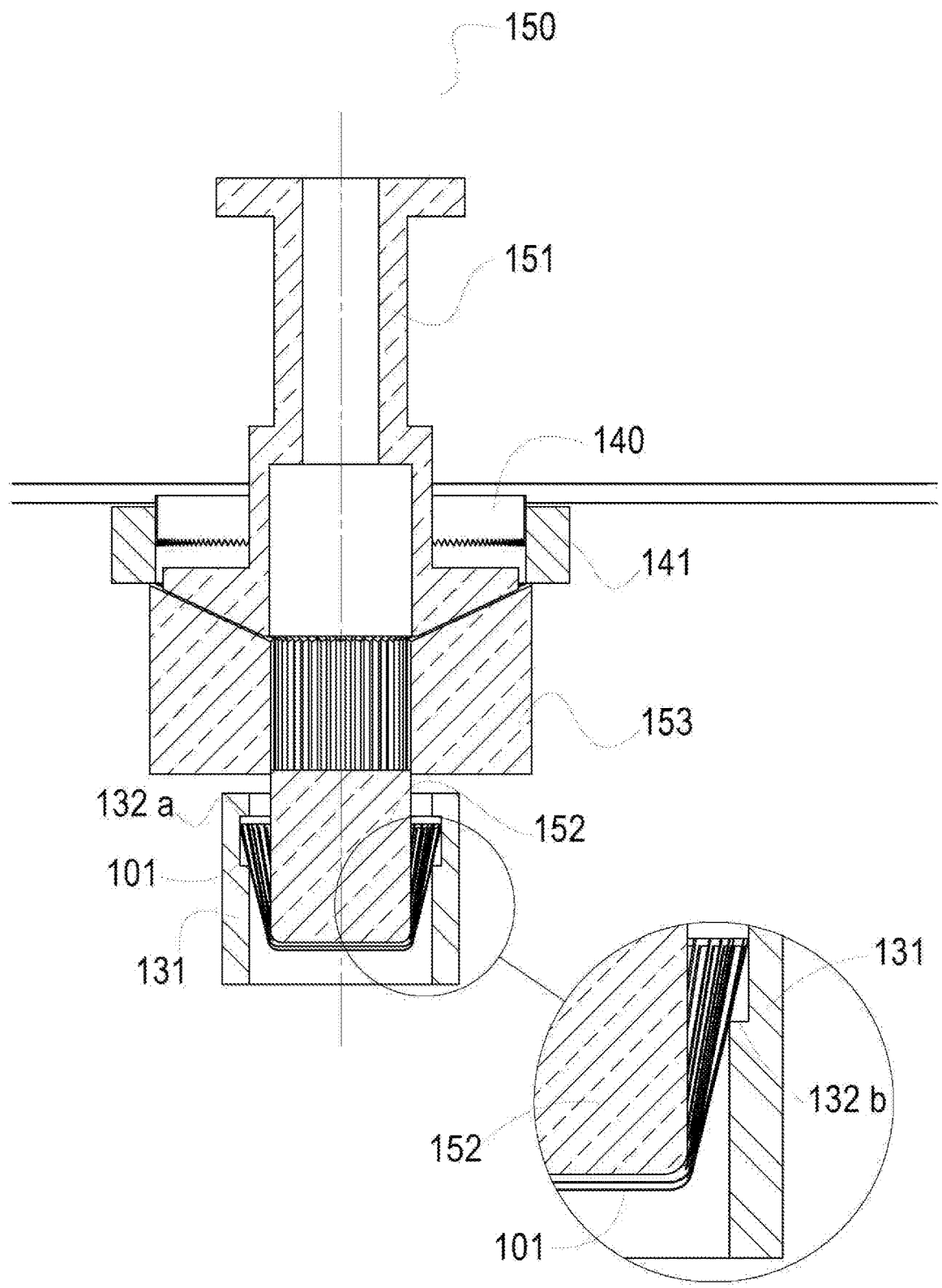
FIG. 6 schematically illustrates a section view of the forming station during the step of forming and insertion in a housing according to a particular embodiment of the present invention.

As shown in FIG. 6, the forming body 152 translates the pleated capsule body 101 up to the inside of a housing 131, which, as described earlier, has the purpose of transporting the pleated capsule body 101 up to the welding station 111.

As shown in FIG. 5, the housing 131 of the transport means 130 has a main inner diameter D3 greater than or equal to the inner diameter D2 of the cylindrical portion of the opening of the counter-mold 153. Therefore, the base of the pleated capsule body 101 thus formed can insert easily inside the housing 131.

For example, if the inner diameter D2 of the cylindrical part of the opening of the counter-mold 153 is equal to 35 mm, the inner opening of the housing 131 can have a main inner diameter D3 equal to 48 mm.

Moreover, the housing 131 has a cavity 132 having a greater diameter D4 than the main inner diameter D3. Such a cavity 132 can, like in the example shown in the figures, be cylinder-shaped and has an upper edge 132a and a lower edge 132b. The cavity 132 can for example have a diameter of 53 mm.

Therefore, as shown in the figures, the pleated capsule body 101 is inserted inside the housing 131 thanks to the movement of the forming body 152 at least until the upper end of the pleated capsule body passes the upper edge 132a of the cavity 132. After having passed such an edge, the upper part of the pleated capsule body 101 will tend to open since, as described earlier, such a cavity 132 has a greater diameter D4 than the main inner diameter D3 of the housing 131. Indeed, after the forming step has taken place, the pleated capsule body 101 will tend by its very nature to open, thus tending to widen, by elasticity of the material, the upper diameter of the pleated capsule body 101. Therefore, the upper part of the pleated capsule body 101 tends to increase its diameter as soon as it reaches larger areas and therefore, in the case represented in the figures, as soon as it reaches the cavity 132 it has the possibility of widening, also being able to touch the inner wall of the cavity 132. Therefore, with such a configuration it is possible to house the pleated capsule body 101 in a safe manner. The upper edge 132a prevents the pleated capsule body 101 from rising up whereas the lower edge 132b makes it possible to support the pleated capsule body 101 so as to prevent possible falling. Moreover, the lower edge 132b can have a bevelled angle so as to more effectively support the pleated capsule body 101 having a larger support surface.

As shown in the detail of FIG. 6, the pleated capsule body 101 will have a frusto-conical shape since the lower part of the pleated capsule body 101 will remain equal to its initial dimension that coincides with that of the diameter D2 of the cylindrical portion of the opening of the counter-mold 153 whereas the walls could also make contact with the inner wall of the cavity 132. This is due to the fact that the material, after having been moulded, tends by its elastic nature to return into its original position.

In a subsequent step, as shown in FIG. 3, and as explained earlier, the pleated capsule bodies 101 are transported inside the welding station 111 by means of the movement of the housings 131.

During the transportation step, it is possible to detect imperfections or defects of the pleated capsule body 101 by means of the detecting means 180. For example, the housings 131 can be made of in transparent material so as to allow the detecting means 180 to be able to directly observe the surface of the pleated capsule body 101.

In the case in which an imperfection is detected on the outer surface, such a pleated capsule body 101 that has an imperfection can be discarded before or after having reached the welding station 111 thus avoiding needless wastes of material. The cameras can be in colour or monochromatic and by means of an adequate illumination and a contrast background they can detect cuts, tears, holes and even stains (for example if the filter is white and the background is black the camera will see all the points in which the filter is damaged in black, in the case of a colour camera it is also possible to see stains of different colours due to impurities of the cellulose or contaminating elements sat on the mechanical groups).

The transport means 130, as stated earlier, comprise a plurality of housings 131 that are translated along a belt having a closed path as shown in FIG. 3. Therefore, once the welding process has ended and the capsule 100 is conducted in the welding station 111, the housings 131 go back empty into the formation station 110 where they can accommodate new pleated capsule bodies 101.

Therefore, in the case in which the detecting means 180 detect imperfections of the pleated capsule body 101, said defective bodies can for example be made to stay inside the housing 131 and expelled after the housing has passed the welding station 111 thus preventing the pleated capsule body 101 having imperfections from being welded together with the reinforcing element 102, thus allowing a saving of material.

The figures show, for example, six molds 150 that correspond to the six welders 160 present in the welding station 111. However, such a number is arbitrary; for example a greater or smaller number of welders 160 and of molds 150 can also be taken. In the case shown in the figures, the number six is selected since it corresponds to the number of parallel rows of housings per capsule present on the rotatable drum 170. In general, therefore, it is particularly advantageous for the number of molds to correspond to the number of welders that in turn corresponds to the number of parallel rows of housings per capsule present on the rotatable drum 170. Indeed, in the example of FIG. 3, the rotatable drum 170 has six parallel rows that correspond to six welders. This solution is particularly advantageous since it makes it possible to speed up the production process of the capsules using multiple welders.

Figure 7:
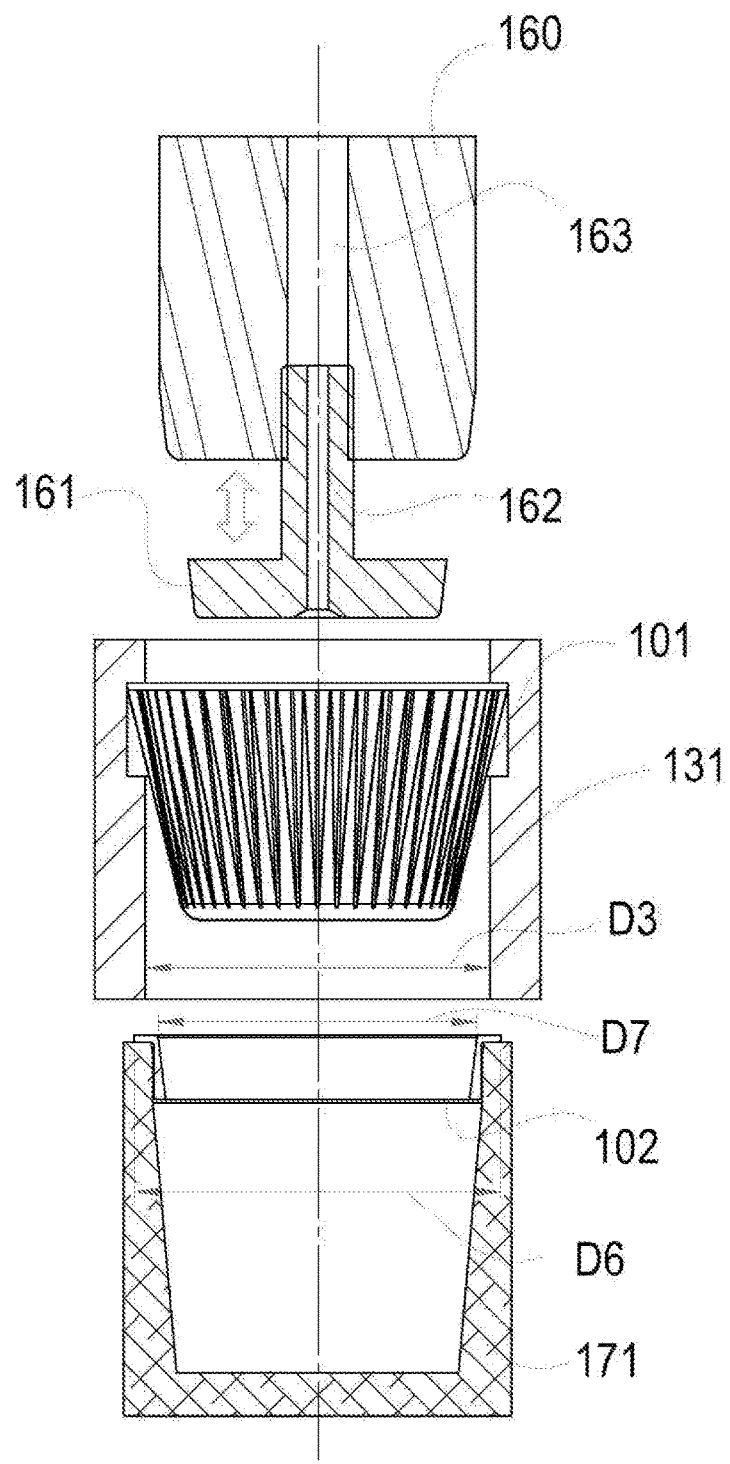
FIG. 7 schematically illustrates a section view of the insertion and welding station during the step of arrival of the pleated capsule body and of the reinforcing ring according to a particular embodiment of the present invention.

Once the pleated capsule body 101 reaches the welding station 111, it is possible to proceed with the welding of the pleated capsule body 101 with the reinforcing element 102. As shown in FIG. 7, in such a station both the pleated capsule body 101 previously formed and the reinforcing element 102, for example the reinforcing ring, are conducted separately. The reinforcing element 102 reaches the welding station 111 by means of the second transport means that, in the particular example represented in the figures, are represented by the rotatable drum 170. However, such second transport means can be represented by other systems like for example carousels or linear systems. As shown in the figures, the reinforcing element 102 reaches the welding station 111 inside a housing 171 of the second transport means. The housing is configured so as to accommodate at least one reinforcing element 102 and to conduct it inside the welding station 111 where the pleated capsule body 101 and the reinforcing element are firstly combined with one another and then welded. For example, in the case in which the second transport means are represented by a rotatable drum 170, such a housing 171 represents one of the housings present on the outer surface of the rotatable drum 170.

The transport means 130 and the second transport means (in the figures represented by the rotatable drum 170) respectively convey the pleated capsule body 101 and the reinforcing element 102 in coaxial position. Therefore, it is thus possible to proceed with the coupling and then with the welding having the reinforcing element 102 arranged coaxially with the pleated capsule body 101.

In the example shown, the pleated capsule body 101 is conducted in the forming station 111 by means of the transport means 130, whereas the reinforcing elements 102 are conducted by means of the rotatable drum 170.

The welding station 111, as described above, can be found on the outer surface of the rotatable drum 170. Such a drum 170 has a plurality of openings capable of housing both the reinforcing elements 102 and the pleated capsule bodies 101. Moreover, with the rotatable drum 170 it is also possible, in another station positioned along the perimeter of the drum (not shown), to proceed with the filling of the capsules 100 and with the closing thereof.

The reinforcing element 102 has an upper end having a greater outer diameter D6 than the main inner diameter D3 of the housing 131. Moreover, the reinforcing element 102 has an upper end having a smaller inner diameter D7 than the main inner diameter D3 of the housing 131.

In the particular embodiment shown in FIGS. 7 to 10 the embodiment of a capsule 100 having a reinforcing ring as reinforcing element 102 is shown in particular.

As shown in FIG. 7, the welder 160 is connected to a thruster 161 that can be translated in the vertical direction so as to vary the positioning of the pleated capsule body 101 with respect to the welder 160 and thus varying the final positioning with respect to the reinforcing element 102. This configuration thus also makes it possible to position pleated capsule bodies 101 having different heights. Indeed, in the case in which there is a pleated capsule body 101 having a different size or it is wished to adjust the positioning of the reinforcing element 102 with respect to the pleated capsule body, it will suffice to adjust the positioning of the thruster 161.

The welder 160 has an inner opening 163 in which the thruster 161 is inserted. The thruster 161 has an opening 162 inside it configured so as to connect the atmosphere beneath the thruster 161 with the inner opening 163 of the welder 160. In this way, it is thus possible for example to suck air A from the lower area of the thruster 161 thanks to the suction of air A from the inner opening 163 of the welder 160.

Figure 8:
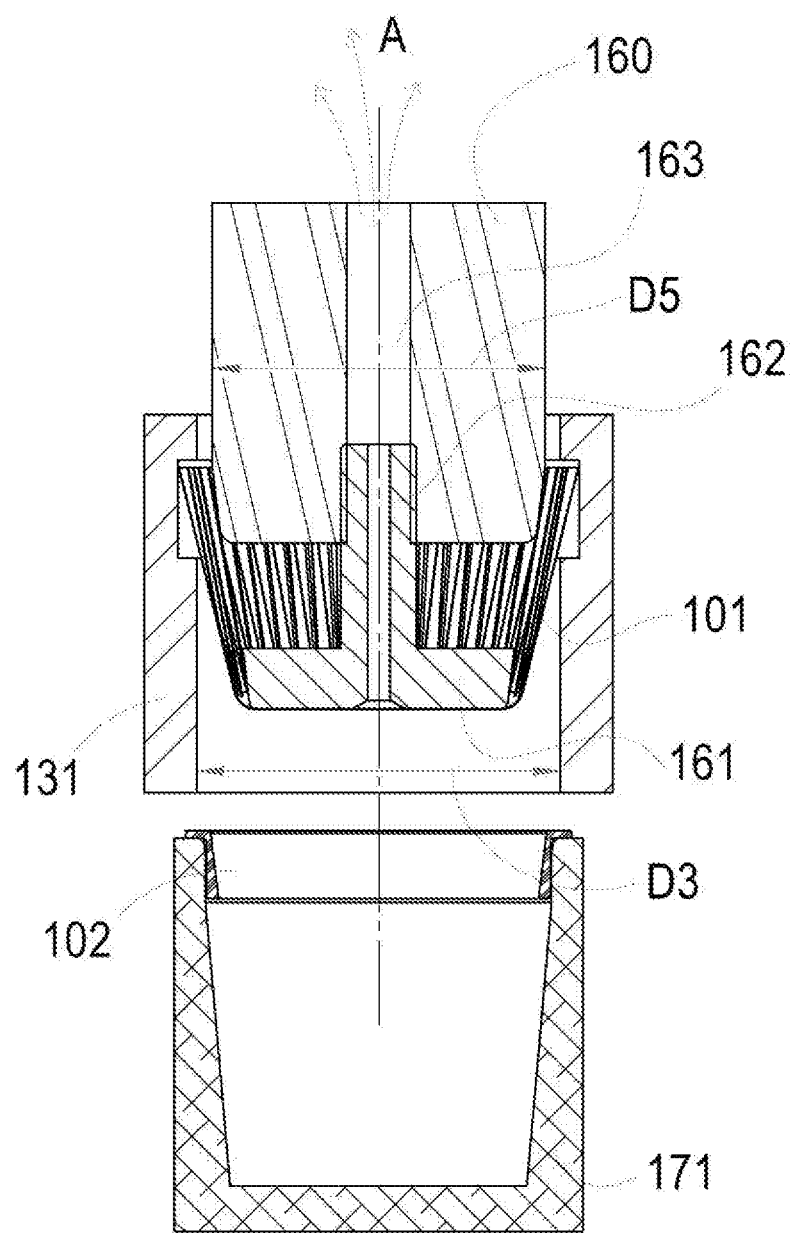
FIG. 8 schematically illustrates a section view of the insertion and welding station during the step of insertion of the welder and of the thruster inside the pleated capsule body according to a particular embodiment of the present invention.

In a subsequent step, as shown in FIG. 8 the welder 160 is moved downwards so as to meet the pleated capsule body 101. By sucking air A from the inner opening 163 of the welder 160, as described above, the pleated capsule body 101 is captured by the thruster 161. In this way the lower surface of the thruster 161 will be positioned in contact with the inner lower surface of the pleated capsule body 101. For this reason, the lower part of the thruster 161 has a frusto-conical shape so as to effectively combine with the lower part of the pleated capsule body 101.

In the example described above in which the housing 131 had a main inner diameter D3 equal to 48 mm the welder 160 will have a diameter D5 less than 48 mm for example equal to 44 mm so as to allow the welder 160 to enter without difficulty inside the opening of the housing 131 so as to effectively "capture" the pleated capsule body 101. Therefore, the ratio between the diameter D4 of the upper end of the pleated capsule body 101 and the diameter D5 of the welder 160, at the moment in which the welder 160 is inserted inside the pleated capsule body, is greater than 1, more preferably greater than 1.1 and even more preferably greater than 1.2.

The welder, as shown in the figures, has a fixed geometry. This configuration makes it possible to make the welding operation simpler and safer. As described above, there is a differentiation of diameters between the bottom of the pleated capsule body 101 and the upper edge of the pleated capsule body 101. Therefore, a pleated capsule body 101 having an accentuated conical shape and in which it is easier to insert a fixed geometry welder without having to use a variable geometry welder is thus created. This is preferable since the variable geometry welder is by its nature more complex since for example to make a circular weld it involves dividing the welding process of the circular surface into at least two separate steps by an interval during which the welder carries out a rotation about its axis.

Figure 9:
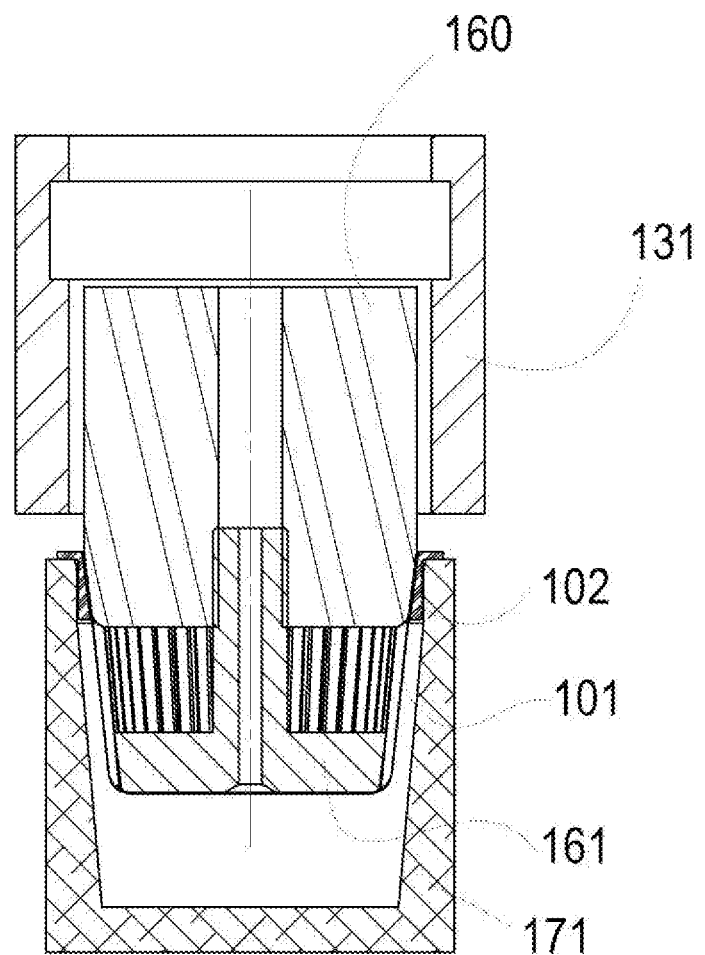
FIG. 9 schematically illustrates a section view of the welding station during the welding step according to a particular embodiment of the present invention.
Figure 10:
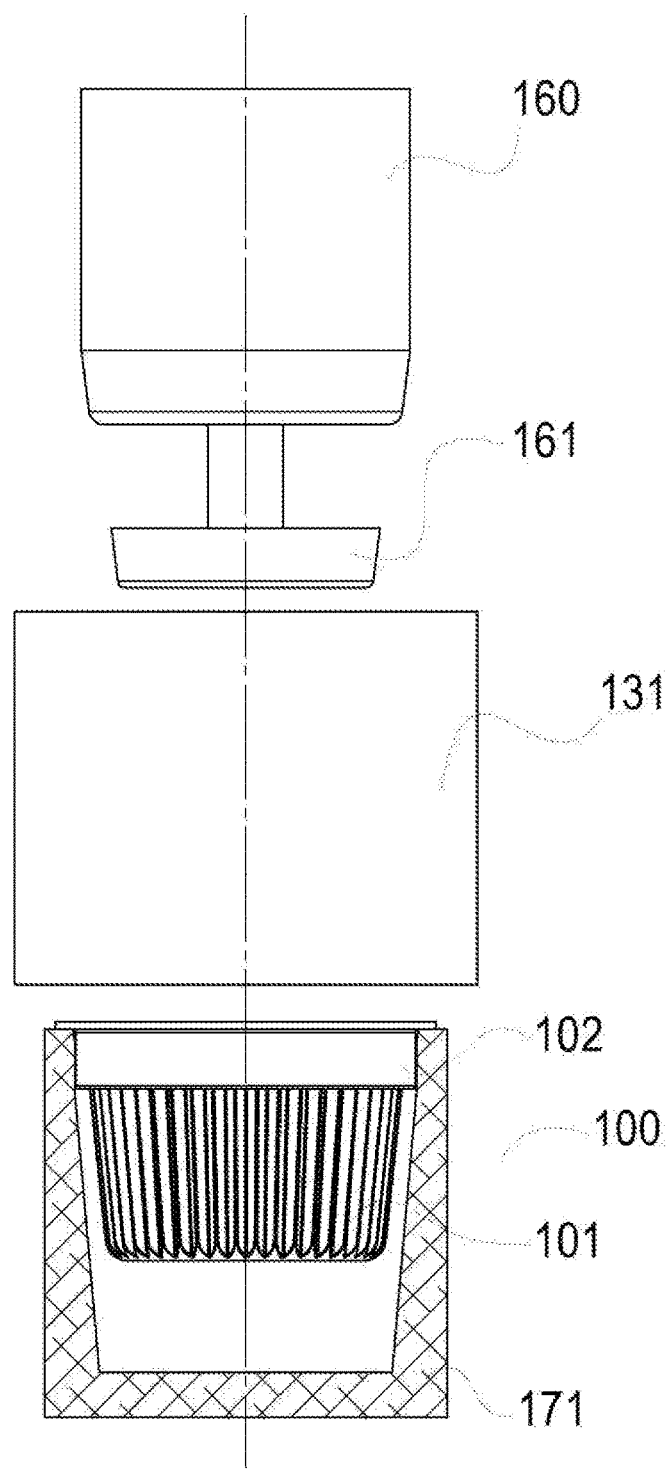
FIG. 10 schematically illustrates a front view of the welding station after the welding step has ended according to a particular embodiment of the present invention.

Thereafter, as shown in FIG. 9, the pleated capsule body 101 is pushed by the thruster 161 towards the reinforcing ring 102 until it enters inside the ring 102. As stated earlier, in the welding station 111 the coupling of the pleated capsule body 101 with the reinforcing ring 102 thus also takes place, which are made to meet in the welding station 111 for the first time. The reinforcing ring 102 can be produced directly on the rotatable drum 170 or, more generally, it is provided by second transport means to the welding station 111. At this point the welding between the pleated capsule body 101 and the reinforcing ring 102 takes place. The welding can be carried out for example by means of a hot bar or by means of other technologies such as ultrasound or induction.

At the end of the welding process, the suction step from the opening 163 of the welder 160 is interrupted. In this way, the capsule 100 formed by the pleated capsule body 101 and by the reinforcing element 102 is released and the welder 160 and the thruster 161 can go back into the starting position, as shown in the front view of FIG. 10.

Thanks to the fact that the outer diameter D6 of the reinforcing ring 102 has a greater diameter than the main inner diameter D3 of the housing 131 it is thus possible to prevent the capsule 100 formed after the welding process from being able to be moved inside the housing 131.

In the particular embodiment shown in FIGS. 11 to 14 the embodiment of a capsule having a container as reinforcing element 102 is shown.

Figure 11:
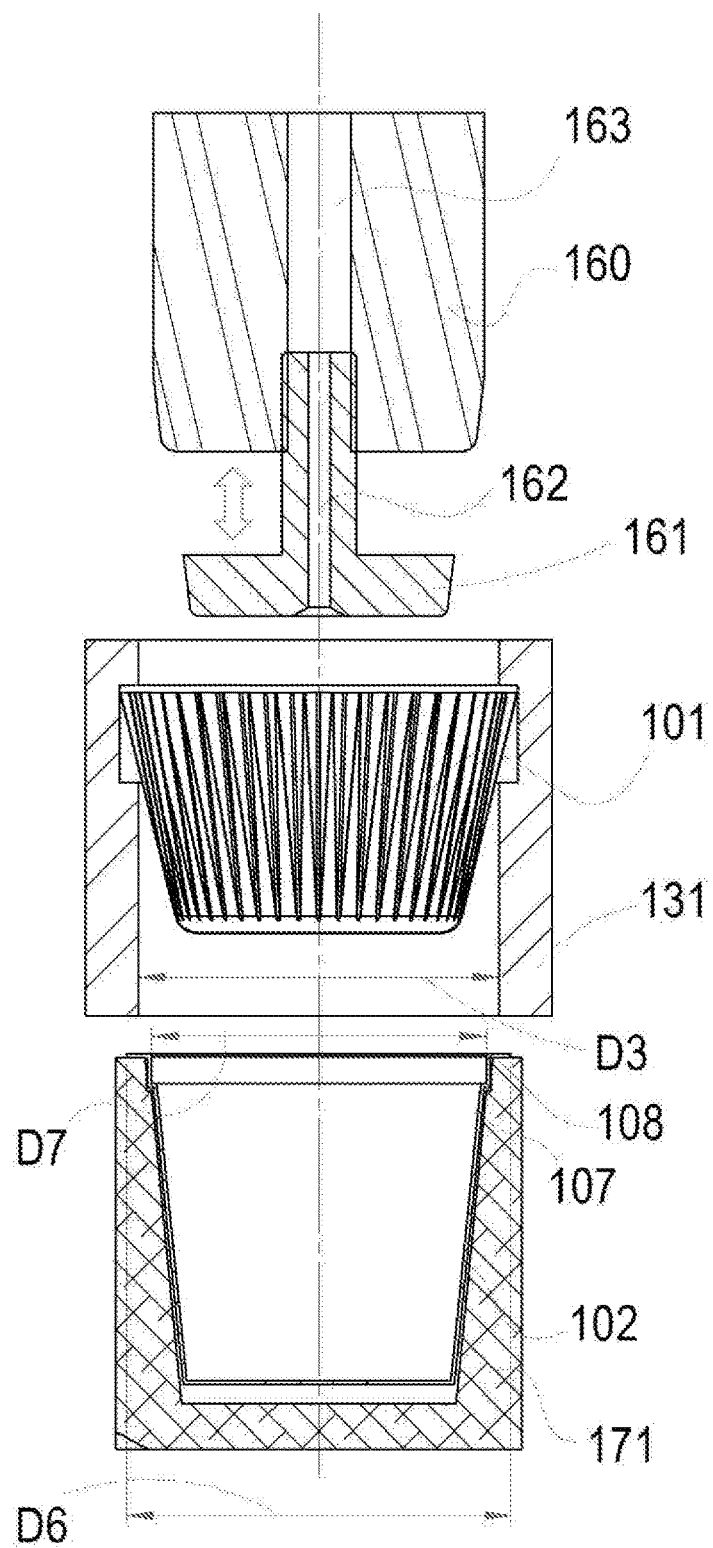
FIG. 11 schematically illustrates a section view of the welding station during the step of arrival of the pleated capsule body and of the reinforcing cup according to a particular embodiment of the present invention.
Figure 12:
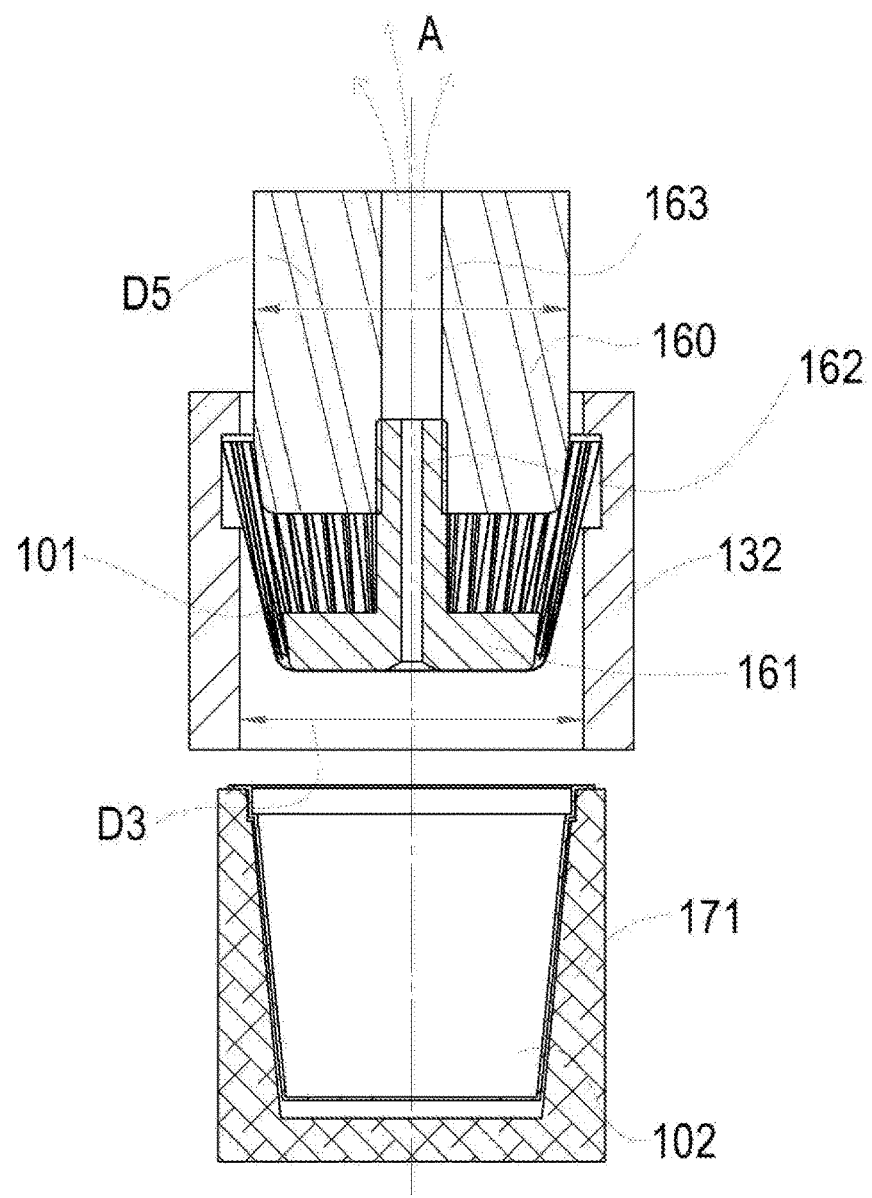
FIG. 12 schematically illustrates a section view of the insertion and welding station during the step of insertion of the welder and of the thruster inside the pleated capsule body according to a particular embodiment of the present invention.

Similarly to what has been seen with the reinforcing element 102 formed by a reinforcing ring, a very similar process can be carried out in the case in which a support cup or container is used instead of the reinforcing ring. As shown in FIG. 11, the reinforcing cup 102 is positioned below the housing 131.

Figure 13:
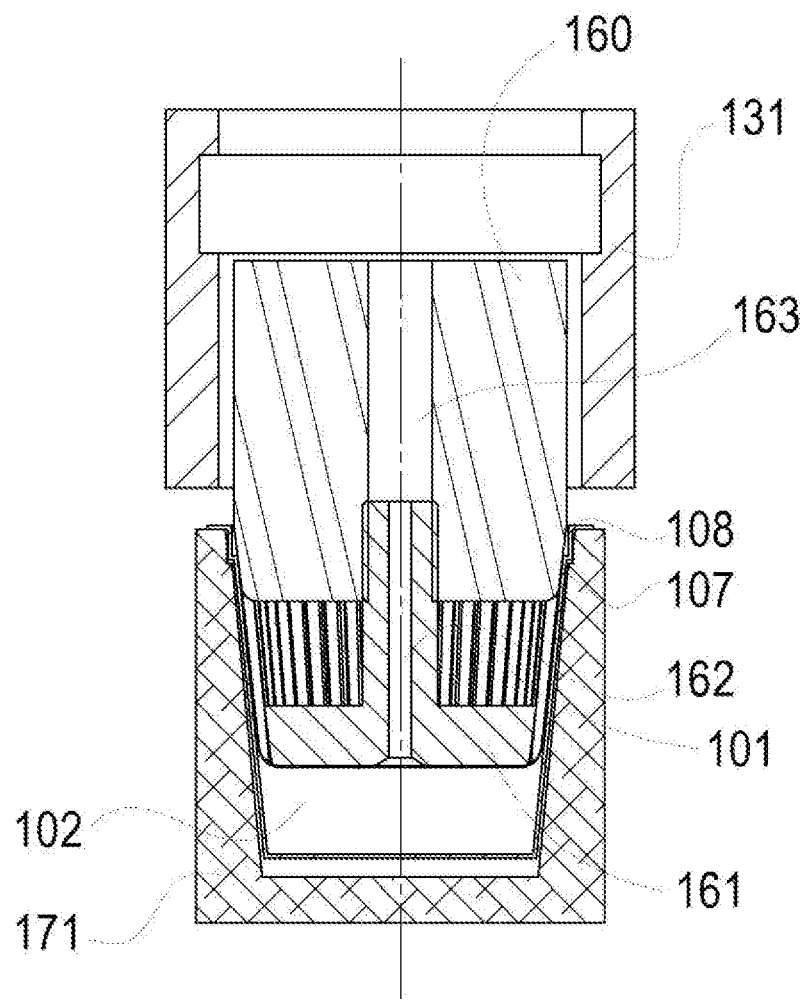
FIG. 13 schematically illustrates a section view of the insertion and welding station during the welding step according to a particular embodiment of the present invention.
Figure 14:
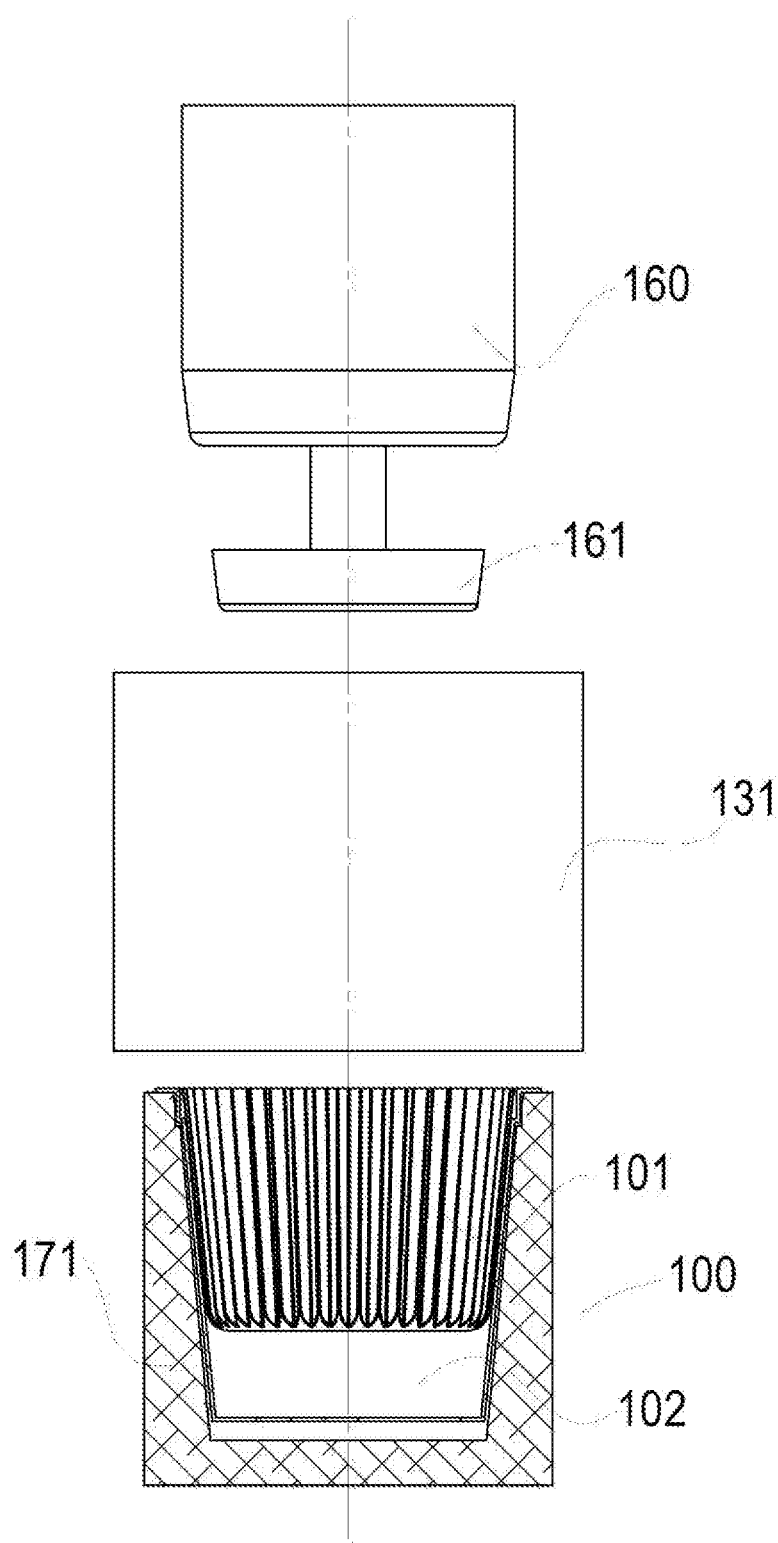
FIG. 14 schematically illustrates a front view of the welding station after the welding step has ended according to a particular embodiment of the present invention.

There are no differences in the step (represented in FIG. 12) of bringing the thruster 161 towards the lower part of the pleated capsule body 101 with respect to the case described above in which there was a reinforcing ring. The only difference, indeed, is to be found in the welding step as shown in FIG. 13. Indeed, the pleated capsule body 101 is pushed by the thruster 161 towards the cup 102 until it enters inside the cup 102. The thrusting process in this case ends when the welder 161 impacts with a portion of the inclined surface 107 of the reinforcing cup 102 and with the upper edge 108 of the upper housing of the reinforcing cup 102 as shown in the figures. The similarity of the diameters and of the angles between the reinforcing ring and the reinforcing cup is particularly advantageous since it makes it possible to use the same welder and the same thruster in both cases without having to make modifications to the system. This makes it possible to facilitate a possible change of format between the reinforcing cup and the reinforcing ring.

As stated earlier, also in this case, in the welding station 111, the coupling of the pleated capsule body 101 with the cup 102 takes place, which are made to meet in the welding station 111 for the first time. The cup 102 can be produced directly on the rotatable drum 170 or, more generally, it is provided to the forming station 111 by means of second transport means. At this point the welding between the pleated capsule body 101 and the cup 102 takes place.

At the end of the welding process, the suction step from the opening 163 of the welder 160 is interrupted. In this way the capsule 100 formed from the pleated capsule body 101 and the cup 102 is released and the welder 160 and the thruster 161 can go back into the starting position, as shown in the front view of FIG. 14.

Thanks to the fact that, as described above, the outer diameter D6 of the cup 102 has a greater diameter than the main inner diameter D3 of the housing 131 it is thus possible to prevent the capsule 100 formed after the welding process from being able to be introduced inside the housing 131.

As stated earlier, and as shown in FIG. 3, a plurality of films arranged one on top of the other so as to form a layered structure can be made to go in the forming station 110. For example, as shown in the figures, it is possible to use a multi-roller structure to make many layers arranged one above the other arrive, without however being in any way constrained with one another. For example, in the case in which it is wished to have a pleated capsule body 101 having many filtering layers, for example in the case in which each layer must have a different fineness of filtering, it is thus possible to adjust the fineness of filtering by inserting different types of filter and combining many filters at the same time. Another example is the case in which it is wished to have the different layers with different properties, for example with different barrier properties. In this case, it is possible to insert for example a layer of material impermeable to air but permeable to liquid.

In the case in which it is wished to use a single layer a single reel 120 is thus necessary on which a film of filter paper or non-woven fabric having for example a basis weight comprised between 20 and 200 g/m$^2$ is wound. The basis weight in this case will vary the filtering capacity and the resistance of the pleated capsule body 101 to the pressure of the liquid coming from outside. For example it is possible to use a basis weight equal to 38 g/m$^2$.

On the other hand, in the case in which it is wished to use a single layer of compostable material it is possible to use a filter paper having a basis weight comprised between 20 and 60 g/m$^2$. In this case the use of compostable materials results in a lower basis weight with respect to the case described above since such materials due to their decomposition characteristics cannot reach the basis weight of conventional materials. For example, a basis weight equal to 35 g/m$^2$ can be used.

Given that, as described above, the compostable material by its nature has a relatively low basis weight, it may be preferable to place many layers on top of one another so as to increase the resistance thereof but at the same time keep the basis weights certified as compostable. Such a solution is ensured by the possibility of conveying a plurality of layers arranged one on top of the other and coming from a plurality of reels 120 towards the forming station 110. Therefore, in the case in which, instead, it is wished to use for example two or more layers of compostable material, many layers of compostable material will be used having, as stated earlier, a basis weight comprised between 20 and 60 g/m$^2$. For example it is possible to use two layers each having a basis weight equal to 25 g/m$^2$.

Moreover, there is also the possibility of inserting a barrier layer so as to provide a barrier to the gases coming from outside and/or from inside the capsule 100. In this way, it is thus possible to maintain the aroma inside the capsule 100 and not disperse it towards the outside, conserving the organoleptic properties of the content of the capsule 100. Therefore, the various types of compostable and non-compostable layers will in this case be combined with a barrier layer that can for example be made of PLA in the compostable case or of EVOH or aluminium in the case of conventional filter material. In the case for example in which it is decided to have aluminium as barrier layer, it will be necessary to use laser pre-notches or areas of reduced thickness that will tear once subjected to high pressure or temperature so as to make it possible to have a barrier to the air and give it a sort of permeability to water.

Thanks to the possibility of having many films arranged one on top of the other inside the forming station 110, it is thus possible to obtain a pleated capsule body 101 formed from many pleated capsule bodies 101 one inside the other, without however needing to weld them with one another since during the forming process they are formed inside one another and, thanks to the fact that it has a pleated shape, this type of shape makes the movement of one layer with respect to the other difficult.

Moreover, the present invention describes a system for the formation of the capsule 100 having a pleated capsule body 101 and a reinforcing element 102. The system comprises mainly two separate machines. Such machines can for example be provided separately and be combined so as to allow the formation of the capsule.

The first machine comprises a first station 110 that coincides with the first station described above and that is configured so as to form the pleated capsule body 101. The first machine also comprises the transport means 130 described above which are configured so as to conduct the pleated capsule body 101 from the first station 110 to the second station 111.

The second machine comprises second transport means that are configured so as to conduct the reinforcing element 102 at the second station 111. Such transport means, as described above, can be represented for example by a rotatable drum 170. However, other available transport systems, known in the state of the art, can be used. Other systems, as an example, are represented by carousels or linear systems. Therefore, it is thus possible to use, as second machine, a machine already present on the market. The second machine can also contain at least one welder 160 that, as described above, has a fixed geometry and is configured so as to weld the pleated capsule body together with the reinforcing element 102.

As described above, the two machines can be combined with one another so as to form a system that allows the capsule 100 to be made. The first machine and the second machine meet at the second station 111. The second station 111 is configured so as to be able to insert the pleated capsule body 101 inside the reinforcing element 102. In addition, the reinforcing element 102 and the pleated capsule body 101, as described above, can be conducted separately and coaxially inside the second station by means of the transport means 130 and the second transport means, respectively.

Even if the present invention has been described with reference to the embodiments described above, it is clear to those skilled in the art that it is possible to make different modifications, variations and improvements of the present invention in light of the teaching described above and in the attached claims without departing from the object and the scope of protection of the invention.

For example, even if a mold has been shown that is positioned above the cutting means in a plant stopped condition, it is also possible to position the cutting means in a station prior to that of the mold in the direction of unwinding of the reel by carrying out a partial cut. Moreover, the cutting means described can be replaced by any other cutting method like for example laser cutting. Therefore, the cut portion of film will be conducted downwards directly by the mold or alternatively by a further element configured so as to be able to translate the cut portion of film downwards.

Moreover, even if a pleated capsule body has always been described, it is clear that the capsule body can be a ramekin. Examples of capsules that can be formed according to the method and/or with the machine based on the present invention are shown in the EC design patent EM03311612. Moreover, even if a capsule body having a large number of pleats has been shown, such a number can also be low.

A plurality of layers have also been described that are conducted in the forming station and it has been stated that it is not necessary for such layers to be placed on top of one another. However, it is clear to those skilled in the art that it is also possible to weld such films together or, alternatively, it is also possible to provide a film formed from a plurality of layers welded together.

Finally, anything that is deemed known by those skilled in the art has not been described in order to avoid needlessly obscuring the invention described.

Consequently, the invention is not limited to the embodiments described above, but is only limited by the scope of protection of the attached claims.

What is claimed is:

1. Method for the formation of a capsule for producing beverages; said capsule comprising a pleated capsule body and a reinforcing element; said method comprising the following steps:
   a. formation of said pleated capsule body of said capsule in a first station;
   b. supply of said reinforcing element in a second station different from said first station;
   c. transportation of said pleated capsule body from said first station to said second station;
   d. insertion in said second station of said pleated capsule body in said reinforcing element;
   e. inserting a welder having a movable thruster into said pleated capsule body;
   f. holding said pleated capsule body against said movable thruster;
   g. moving said movable thruster relative to said welder, whereby said welder is held adjacent a selected portion of said pleated capsule body; and
   h. fixing of said pleated capsule body to said reinforcing element in said second station, wherein said fixing step comprises a step of welding realized by means of said welder, wherein said welder has a fixed geometry.

2. Method according to claim 1, wherein said reinforcing element and said pleated capsule body are provided separately and coaxially to said second station to perform said step of insertion of said pleated capsule body in said reinforcing element.

3. Method according to claim 2, wherein said pleated capsule body is provided to said second station by means of first transport means and said reinforcing element is provided to said second station by means of second transport means different from said first transport means; wherein said second transport means comprises a rotatable drum.

4. Method according to claim 1, wherein said step of inserting said pleated capsule body in said reinforcing element and/or said fixing step are carried out by exploiting a difference of diameters between elements that constitute said second station.

5. Method according to claim 4, wherein said difference of diameters allows to have said pleated capsule body which, during said transportation step, has an upper diameter greater than a diameter of said fixed geometry welder with which said pleated capsule body is welded with said reinforcing element, wherein a ratio between said upper diameter of said pleated capsule body and said diameter of said welder, during a step of insertion of said welder in said pleated capsule body, is greater than 1.

6. Method according to claim 1, wherein said step of formation of said pleated capsule body comprises the following steps:
   a. unrolling of at least one film from a reel;
   b. conveying of said film in said first station;
   c. blanking of a portion of said film;
   d. formation of said pleated capsule body from the blanked portion.

7. Method according to claim 1, wherein said step of formation of said pleated capsule body comprises a step of forming from at least two films arranged one above the other so as to form said pleated capsule body having a layered structure.

8. Method according to claim 1, wherein said step of insertion of said pleated capsule body in said reinforcing element is carried out on a rotatable drum.

9. Method according to claim 1, further comprising a step of control of said pleated capsule body during said transportation step.

10. Method according to claim 1, wherein said pleated capsule body is made of filter material.

11. A method for forming a capsule used for producing beverages comprising the steps of:
   forming a pleated capsule body in a first station;
   supplying a reinforcing element in a second station different from the first station;
   transporting the pleated capsule body from the first station to the second station;
   inserting the pleated capsule body into a first housing;
   inserting the reinforcing element into a second housing;
   positioning the first housing adjacent the second housing, thereby aligning the pleated capsule body with the reinforcing element;
   inserting a welder with an inner opening and having a movable thruster into the pleated capsule body;
   sucking air from the inner opening, whereby the pleated capsule body is held against the movable thruster;

moving the movable thruster relative to the welder, wherein the welder is held adjacent a selected portion of the pleated capsule body;

inserting the welder and the pleated capsule body into the reinforcing element to a position where the selected portion of the pleated capsule body is adjacent the reinforcing element; and welding the pleated capsule body at the selected portion to the reinforcing element with the welder.

* * * * *